(12) United States Patent
Au et al.

(10) Patent No.: US 9,104,308 B2
(45) Date of Patent: Aug. 11, 2015

(54) MULTI-TOUCH FINGER REGISTRATION AND ITS APPLICATIONS

(75) Inventors: Kin-Chung Au, Hong Kong (CN); Chiew-Lan Tai, Hong Kong (CN)

(73) Assignee: The Hong Kong University of Science and Technology, Kowloon (HK)

( * ) Notice: Subject to any disclaimer, the term of this patent is extended or adjusted under 35 U.S.C. 154(b) by 680 days.

(21) Appl. No.: 13/328,549

(22) Filed: Dec. 16, 2011

(65) Prior Publication Data
US 2012/0154313 A1 Jun. 21, 2012

Related U.S. Application Data

(60) Provisional application No. 61/457,055, filed on Dec. 17, 2010.

(51) Int. Cl.
*G06F 3/0488* (2013.01)
(52) U.S. Cl.
CPC .. *G06F 3/04883* (2013.01); *G06F 2203/04808* (2013.01)
(58) Field of Classification Search
CPC .... G06F 3/0487–3/04883; G06F 2203/04808; G06F 3/04886; G06F 3/0488; G06F 21/32; G06F 21/83; G06F 2221/2117; G06F 3/041; G06K 9/00006; G06K 9/00154; G06K 9/00013; G06K 9/00355; G06Q 20/341; G06Q 20/40145; G06Q 20/4014
USPC ...................... 345/156–184; 178/18.01–20.04
See application file for complete search history.

(56) References Cited

U.S. PATENT DOCUMENTS

| | | | | | |
|---|---|---|---|---|---|
| 4,868,912 | A | * | 9/1989 | Doering | 345/175 |
| 5,764,222 | A | * | 6/1998 | Shieh | 345/173 |
| 5,856,824 | A | * | 1/1999 | Shieh | 345/173 |
| 6,084,576 | A | * | 7/2000 | Leu et al. | 345/168 |
| 6,307,956 | B1 | * | 10/2001 | Black | 382/124 |
| 7,352,365 | B2 | * | 4/2008 | Trachte | 345/173 |
| 2002/0025062 | A1 | * | 2/2002 | Black | 382/116 |
| 2003/0193478 | A1 | * | 10/2003 | Ng et al. | 345/168 |
| 2005/0180618 | A1 | * | 8/2005 | Black | 382/124 |
| 2005/0206730 | A1 | * | 9/2005 | Hagiwara | 348/169 |
| 2007/0268273 | A1 | | 11/2007 | Westerman et al. | |
| 2008/0055255 | A1 | * | 3/2008 | Griffin | 345/173 |
| 2008/0252603 | A1 | * | 10/2008 | Dietz et al. | 345/169 |
| 2009/0137279 | A1 | * | 5/2009 | Silfverberg | 455/566 |

(Continued)

OTHER PUBLICATIONS

IBM Technical Disclosure Bulletin vol. 36, Nov. 11, "Soft Adaptive Follow-Finger Keyboard for Touch Screen Pads," Nov. 1993.*

(Continued)

*Primary Examiner* — Dmitriy Bolotin
(74) *Attorney, Agent, or Firm* — Amin, Turocy & Watson, LLP

(57) ABSTRACT

Described herein are finger registration systems and methods for use with a multi-touch device that can facilitate in place execution of commands or operations, thereby reducing focus switching and minimizing hand movement. The finger registration methods are simple and robust, using only contact points on the touch-based device, without requiring additional hardware. Direct mapping of operations to gestures involving individual fingers or combination of fingers (e.g., finger chords), provides a new and rich set of direct manipulation without focus switching for selecting commands/operations.

28 Claims, 10 Drawing Sheets

(56) References Cited

U.S. PATENT DOCUMENTS

| | | | |
|---|---|---|---|
| 2009/0237359 A1* | 9/2009 | Kim et al. | 345/168 |
| 2009/0237361 A1* | 9/2009 | Mosby et al. | 345/173 |
| 2010/0085313 A1* | 4/2010 | Rider | 345/173 |
| 2011/0050576 A1* | 3/2011 | Forutanpour et al. | 345/168 |
| 2011/0061017 A1* | 3/2011 | Ullrich et al. | 715/780 |
| 2011/0187647 A1* | 8/2011 | Woloszynski et al. | 345/168 |
| 2011/0296333 A1* | 12/2011 | Bateman et al. | 715/773 |
| 2012/0075192 A1* | 3/2012 | Marsden et al. | 345/168 |
| 2012/0113023 A1* | 5/2012 | Koch et al. | 345/173 |
| 2012/0113126 A1* | 5/2012 | Koch et al. | 345/473 |
| 2012/0117501 A1* | 5/2012 | Koch et al. | 715/769 |
| 2012/0131490 A1* | 5/2012 | Lin et al. | 715/773 |
| 2012/0166833 A1* | 6/2012 | Iwai et al. | 713/320 |
| 2012/0260207 A1* | 10/2012 | Treskunov et al. | 715/773 |
| 2012/0293417 A1* | 11/2012 | Dennis | 345/168 |
| 2012/0306759 A1* | 12/2012 | Luo | 345/168 |
| 2013/0063361 A1* | 3/2013 | Pasquero et al. | 345/173 |
| 2013/0207920 A1* | 8/2013 | McCann et al. | 345/173 |
| 2013/0275907 A1* | 10/2013 | Lau et al. | 715/773 |
| 2014/0298266 A1* | 10/2014 | Lapp | 715/835 |

OTHER PUBLICATIONS

"LiquidKeyboard-Touch-typing on touch screens and surfaces", https://www.youtube.com/watch?v=47okf4aykUg, Published on Oct. 26, 2010.*

U.S. Appl. No. 61/375,483, filed Aug. 20, 2010.*

Bailly, et al., Finger-Count and Radial-Stroke Shortcuts: Two Techniques for Augmenting Linear Menus. ACM CHI. 591-594 (2010), 4 pages.

Brandl, et al., "Combining and Measuring the Benefits of Bimanual Pen and Direct-Touch Interaction on Horizontal Interfaces." ACM AVI. 154-161 (2008), 8 pages.

Card, "User perceptual mechanisms in the search of computer command menus." ACM CHI. 190-196 (1982).

Davidson, et al., "Extending 2D object arrangement with pressure-sensitive layering cues." ACM UIST. 87-90 (2008).

Dietz, et al., "DiamondTouch: a multi-user touch technology." ACM UIST. 219-226 (2001).

Fingerworks, Inc. (2008). User's Guide. http://www.fingerworks.com/gesture_guide_mouse.html.

Esenther, et al., Fluid DTMouse: better mouse support for touch-based interactions. In Proceedings of the Working Conference on Advanced Visual interfaces. 112-115, (2006), 6 pages.

Holz, et al., The Generalized Perceived Input Point Model and How to Double Touch Accuracy by Extracting Fingerprints, ACM CHI. 581-590 (2010), 7 pages.

Hopkins, "The design and implementation of pie menus." In Dr. Dobb's J. 16, 12 (Dec. 1991), 16-26.

Izadi, et al., ThinSight: integrated optical multi-touch sensing through thin form-factor displays. Proceedings of the 2007 workshop on Emerging displays technologies, vol. 252 (2007).

Lepinski, et al., "The design and evaluation of multitouch marking menus" ACM CHI. 2233-2242 (2010) 10 pages.

Malik, et al., "Interacting with large displays from a distance with vision-tracked multi-finger gestural input." ACM UIST. 43-52 (2005).

Matejka, et al., "The design and evaluation of multi-finger mouse emulation techniques." ACM CHI (2009), 10 pages.

Moscovich, et al., "Multi-finger cursor techniques." Proceedings of Graphics interface. 1-7, (2006), 7 pages.

Rekimoto, "SmartSkin: an infrastructure for freehand manipulation on interactive surfaces." ACM CHI. 113-120 (2002), 8 pages.

Wang, et al., "Detecting and Leveraging Finger Orientation for Interaction with Direct-Touch Surfaces." ACM UIST. 23-32, (2009), 10 pages.

Wilson, "PlayAnywhere: A Compact Tabletop Computer Vision System.", (2005) ACM UIST. 83-92.

Wu, et al., "Multi-finger and whole hand gestural interaction techniques for multiuser tabletop displays." ACM UIST. 193-202 (2003), 10 pages.

* cited by examiner

MULTI-TOUCH FINGER REGISTRATION AND ITS APPLICATIONS

RELATED APPLICATION

This patent application claims priority to U.S. Provisional Patent Appln. No. 61/457,055, entitled "Multitouch Finger Registration and its Applications," filed Dec. 17, 2010, the entirety of which is incorporated herein by reference.

TECHNICAL FIELD

This disclosure relates generally to touch devices, and in particular to multi-touch finger registration methods and associated applications.

BACKGROUND

Multi-touch devices, which are commonly available in connection with digital devices, can provide richer user input to interactive systems compared to single-point input devices, such as a mouse or a pen. Multi-touch inputs can be gestures, such as a tap, a press, or a swipe, or an ordered sequence of gestures that can control user interface (UI) elements or directly manipulate data. Most existing user interfaces use only two contact points, which have simpler and less ambiguous contact status. Multi-touch devices can detect the user's intended operations based on the number of finger contact points, the relative location of the finger contact points and the motion (e.g. tapping, pressing or swiping). These user interfaces do not rely on distinguishing which hand or fingers are in contact with the touch device.

Finger identification alone is not new. The ability to distinguish which hand or finger is contacting the touch device provides useful additional information. Such information can allow direct mapping between a user's fingers and interface operations. It also becomes possible to assign different interface operations to gestures involving different combinations of hands and fingers. Some existing devices can detect different fingers through capacitive sensing or vision based systems; however, these devices require special hardware and detect different touch-related information, such as the contact area, touch pressure, presence of floating fingers above the multi-touch surface, and fingerpoint, leading to difficulty designing general, customizable and platform-independent multi-touch user interfaces. No existing techniques can distinguish different hands and fingers directly from only the positions of the contact points on the touch input device.

The above-described deficiencies of conventional multi-touch techniques are merely intended to provide an overview of some of problems of current technology, and are not intended to be exhaustive. Other problems with the state of the art and corresponding benefits of some of the various non-limiting embodiments described herein may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

To correct for at least the above noted deficiencies and other drawbacks of conventional multi-touch techniques, finger registration methods are provided herein that can distinguish between fingers and hands on touch-based devices such as touch screens and touch pads. The method can include first computing a reference point based on contact points of fingers of a hand and connecting the contact points to the reference point. Spanning angles can be calculated between the contact points with the reference point as a vertex for all of the spanning angles. The contact points corresponding to a thumb and index finger on the touch device can be determined based on the spanning angles and distances between contact points. Based on whether the index finger is located in a clockwise or counterclockwise direction from the thumb, it can be determined whether the hand is a left hand or a right hand. The middle and ring fingers and pinkie can be determined to correspond to the additional contact points—in the counter clockwise direction for the left hand and in a clockwise direction for the right hand.

The finger registration can be utilized when a single hand is applied to the touch device. However, the finger registration can also be utilized when two hands from a single user or multiple hands from multiple users are applied to the touch device. Based on the finger and hand identification, user interfaces can be adjusted to correspond to the layout and orientation of the hand(s) that are detected. User interfaces elements can be formatted and resized according to the location of fingers and fingertip sizes. The user interfaces can be pop-up interfaces generated after finger registration. Examples of pop-up interfaces include palm menu and virtual keyboards.

Many different apparatuses can be utilized to perform these methods and implement these systems, such as multi-touch input devices, touch screens, touch pads, or the like. Any digital device that can receive a multi-touch input and execute one or more of the methods described herein based on the input is conceived within the scope of this specification.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
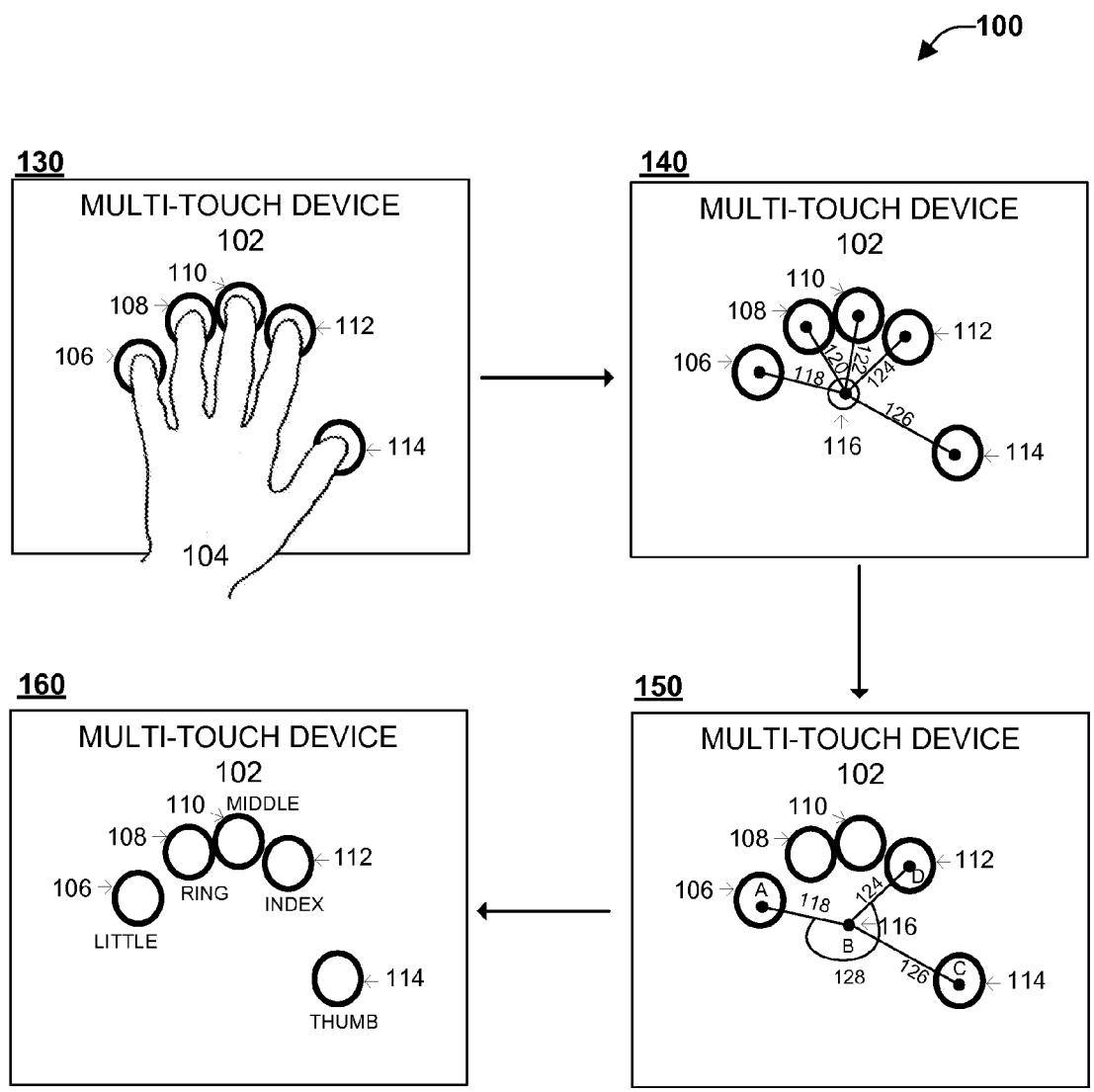
FIG. 1 is a schematic diagram of a method for finger and hand registration on a touch device.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Described herein are various embodiments that can employ multi-touch finger registration to differentiate between different fingers and different hands in real-time directly from finger contact points on a device. A user can place a hand on the device in any orientation and the device can employ the finger registration methods to determine the fingers and the hand. In the case of hardware limitation, the user can place the first three fingers, the thumb, index and middle fingers, on the touch device. User interfaces can be dynamically adapted to conform to the fingers' locations and spacing based on the finger registration. Accordingly, the user interfaces can dynamically adapt for different users, adjusting user interface components to accommodate hands of different orientations and sizes and different finger configurations in natural poses (e.g., more curved or spread out). Once the fingers are registered and the user interface components dynamically adjusted, the user can perform multi-touch gestures to carry out desired operations in connection with the user interface.

Reference throughout this specification to "various embodiments," "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

The words "exemplary" and "example" is used herein to mean serving as an example, instance, or illustration. For the avoidance of doubt, the subject matter described herein is not limited by such examples. In addition, any aspect or design described herein as "exemplary" is not necessarily to be construed as preferred or advantageous over other aspects or designs, nor is it meant to preclude equivalent structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The corresponding figures illustrate systems, methods or algorithms based on multi-touch finger registration in connection with a touch device. Any digital device, such as a desktop computer, laptop computer, mobile internet device, tablet computer, mobile phone, or the like, can be such a device. Any device that can receive touch inputs can be a "touch device" or "device" as described herein. The multi-touch finger registration systems and methods can facilitate the design of user interfaces for use with a touch device for many applications requiring dynamic, on demand and in-place command selections and operations. The user interfaces can be generated in-place based on the location of the fingers (e.g., menu buttons at the locations of the finger tips). It will be understood that multi-touch device and touch-based device are used interchangeably herein.

For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts can be required to implement the components, methods or algorithms as described herein. In addition, those skilled in the art will understand and appreciate that the methods could alternatively be represented as a series of interrelated states via a state diagram or events. The components and methods can be stored in memory or other non-transitory computer readable storage medium and executed by a processor to facilitate the acts shown in the figures.

Referring now to FIG. 1, illustrated is a schematic diagram of a method 100 for multi-touch finger registration on the surface of a multi-touch device 102. The multi-touch device 102 can be, for example, a touch screen or a touch pad.

The method 100 is only activated by a specific gesture on the multi-touch device 102 (e.g., when a user rests either all five fingers of a hand or at least the thumb, index and middle fingers in the case of hardware limitation on the number of detectable contact points on the touch device 102 and three or more contact points are detected), so method 100 can be concurrently utilized with other touch-based interfaces that do not require finger registration, gestures requiring two fingers, such as two-dimensional (2D) rotation and scaling, or gestures requiring one finger, such as direct cursor tracking, scrolling or flicking.

The method 100 for finger registration described herein can identify in real time which hand and fingers of a user (e.g., hand 104) are touching the multi-touch device 102. The method 100 can distinguish different hands and fingers directly from the points where the hand 104 contacts the multi-touch device 102 ("contact points" 106-114). Hand 104 can be a single hand from a single user, both hands from a single user, or multiple hands from multiple users. The user can place the hand 104 on the multi-touch device 102 so that at least the thumb, index and middle fingers touch the multi-touch device 102. The fingers can be in any configuration corresponding to a natural pose (e.g., more/less spread out, more/less curved, and the like). When the contact points are detected, the finger registration procedure 100 is invoked to determine which contact point belongs to which finger and which hand is touching the touch device. The method 100 can be performed in real time, and the method 100 is independent of the location and orientation of the hand 104 because the method 100 only depends on the relative positions of contact points 106-114. The method 100 is also independent on features of the hand 104, such as orientation or size, so that method 100 can be employed for different users.

The method 100 can facilitate customization of user interface elements, including "pop up" interface elements that are displayed to the user only after the finger registration method 100 occurs. The pop up interface can be dynamically reorganized for each user or for each time method 100 occurs. The pop up user interface can be reorganized or resized to match the orientation or size of the hand 104 and/or the locations of the fingers registered according to the finger registration method 100. The reorganized or resized user interface elements can have multiple interactive regions, such as palm menu or a virtual keyboard. With the user interface elements adjusted to a user's fingers, a user can perform in-place interaction with the user interface elements or components while maintaining a focus on the task at hand. For example, if commonly-used operations—like copy, paste, save, or the like—are each associated with a specific finger, the user can focus on an editing task and simply tap a finger to activate a command. The task at hand can, for example, be editing or manipulating any object, such as text, an image, a three dimensional object, or the like. With such a customized, in place menu, a user needs not move a hand and/or switch eye focus.

The finger registration method 100 begins at element 130 when all fingers of a hand 104, or in the case of hardware limitation, at least the thumb, index and middle fingers are in contact with the multi-touch device 102, causing the detection of the fingers contacting the multi-touch device 102 at various contact points 106-114. FIG. 1 shows five fingers of the hand 104 contacting the multi-touch device 102 at five contact points 106-114. Additionally, FIG. 1 shows circles drawn around the contact points 106-114. At any point after contact points 106-114 are detected, the touch display device can display any shape, such as a circle, that can delineate the contact points 106-114. However, finger registration can also be used on a touch pad and be transparent to the user without any visual feedback.

The fingers contacting the multi-user device 102 can be detected by any kind of sensor or transducer associated with the multi-touch device 102. The sensor can be of any type that can detect the presence of a finger on the multi-touch device 102, including pressure sensors, temperature sensors, or the like. Although contact points are described herein, additional information, such as information about the contact area, information about the contact region, information about the finger pressure, and other tactile inputs, can be utilized in the finger detection either alone or in connection with the contact points.

The finger registration method 100 is based on the relative positions of the finger tips corresponding to the contact points 106-114. Accordingly, at element 140, a reference point 116 is calculated based on the contact points 106-114 and the contact points can be connected to the reference point 116 through connecting lines 118-126. For example, the reference point 116 can be a center point that is calculated from the contact points 106-114. However, the reference point 116 can be any point on the multi-touch device 102 calculated according to any formula as long as the same reference point 116 is used with respect to all of the contact points 106-114.

The reference point 116 can be employed to facilitate measurement of all of the angles between the lines 116-126. The spanning angle for each contact point 106-114 can be defined as the sum of the two angles on each side of the corresponding connecting line 118-126. At element 150, spanning angles can be calculated for each of the contact points 106-114, with the reference point 116 as the vertex. Although spanning angles are determined for each contact point, FIG. 1 displays one spanning angle 128 for simplicity of illustration; however, a spanning angle is similarly calculated for each of the contact points.

According to the example illustrated in FIG. 1, contact point 106 is labeled point "A," contact point 114 is labeled "C," contact point 112 is labeled point "D" and the reference point is labeled point "B," making connecting line 118 line "AB," connecting line 126 line "CB," and connecting line 124 line "BD." Accordingly, spanning angle 128 corresponding to contact point 114 is angle ABD and is defined as the sum of angle ABC and angle CBD. The spanning angle is defined the same way for each contact point: the sum of the angle to the right of (or clockwise to) the connecting line and the angle to the left of (or counterclockwise to) the connecting line.

After all of the spanning angles have been determined, at element 150, it can be assumed that the largest spanning angle corresponds to the thumb, so the thumb can be identified as the contact point with the largest spanning angle. Since the thumb is assumed to have the largest spanning angle when the fingers are in a naturally curved pose, method 100 first identifies the thumb as the contact point with the largest spanning angle compared to the other spanning angles (in this case, contact point 114).

After the thumb is identified, the index finger can be identified. The index finger can be defined as the contact point closest to the thumb. In the illustrated example, point D is closest to the thumb, so contact point 112 is the closest to the thumb; accordingly, contact point 112 can be labeled as the index finger.

The thumb 114 and the index finger 112 can be used to determine whether the hand is a left hand or a right hand. With a left hand, the index finger is located in a counterclockwise direction from the thumb. With a right hand, the index finger is located in a clockwise direction from the thumb. The other fingers (middle finger, ring finger, little finger) can be determined following the index finger in the same direction as the index finger. In the illustrated example, since the index finger 112 is located in a counter clockwise direction from the thumb 114, the fingers can be labeled in a counter clockwise direction, middle finger 110, ring finger 108 and little finger 106. In a right hand example, the fingers can be labeled in a clockwise direction. The multi-touch device 102 can display any indicator (such as circles and text) around the contact points 106-114 or not display anything at all.

The ability to distinguish individual contact fingers can facilitate the design of dynamic pop-up user interfaces, activated by the contact points of the fingers. The contact points and the registered hand(s) and fingers can be utilized to customize the user interfaces. Each of such user interfaces can have a basic layout that can be automatically adjusted for an individual user based on the orientation and size of the hand 104 and the spread and location of the fingers registered according to method 100. Components of the user interface can be arranged and rescaled according to the contact points of registered fingers. Accordingly, a user can directly manipulate the interface without consciously switching focus to match finger placements and locations of the components or elements of the user interface.

The contact points of method 100 can serve as reference points for a dynamic interface. When selecting a specific user interface item or location, the intention of the user can be determined based on the current contact positions and the contact points determined during registration. This can reduce the requirement for input precision. For example, a popup menu button can be located exactly at the finger contact points, which can allow the closest button to be considered as being selected when a user taps the screen after the menu is popped up. Such acceptance of imprecise input allows the user to operate the menu without looking at the user interface elements.

Figure 2:
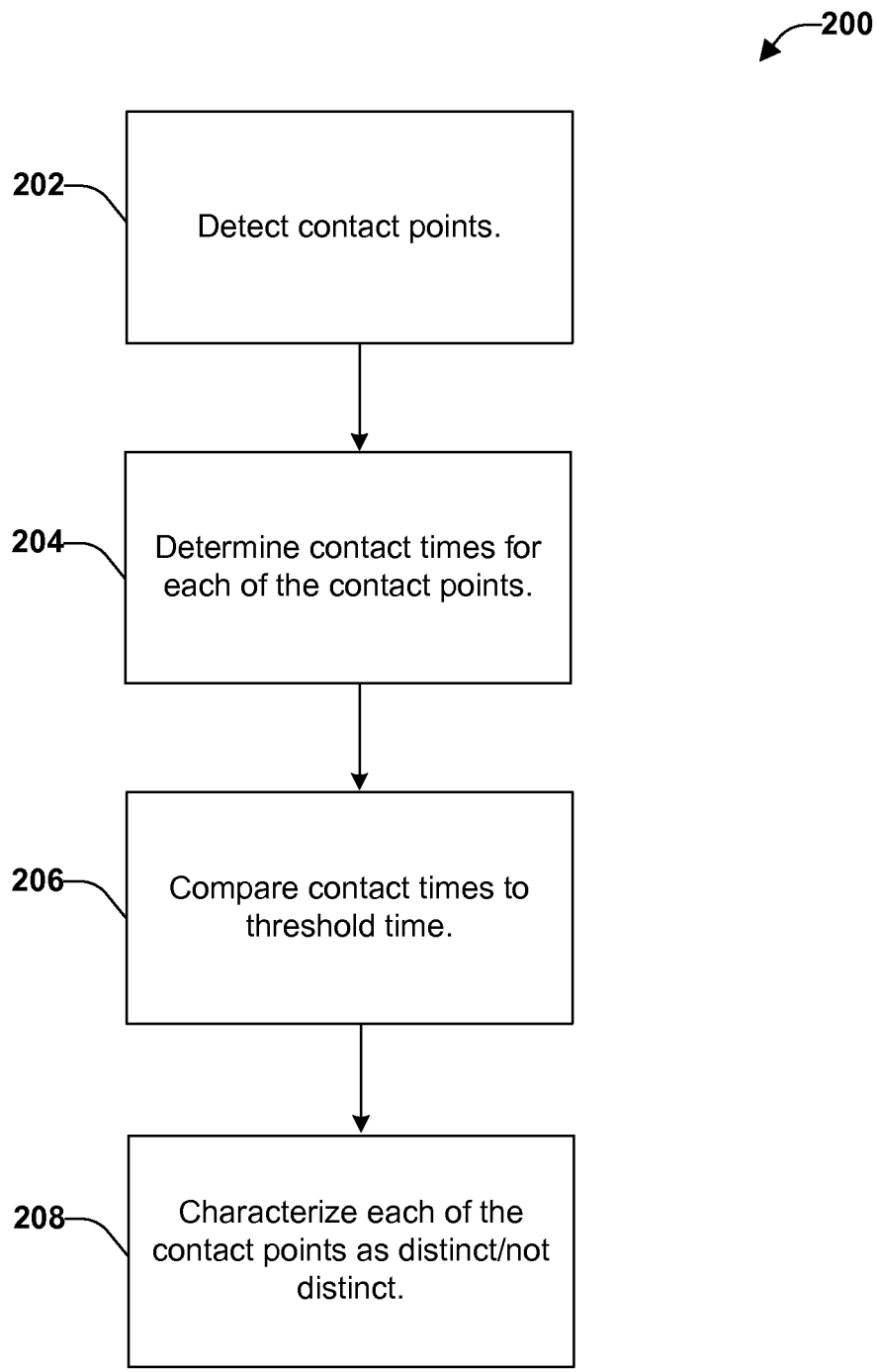
FIG. 2 is a schematic process flow diagram of a method for detecting distinct contact points.
Figure 3:
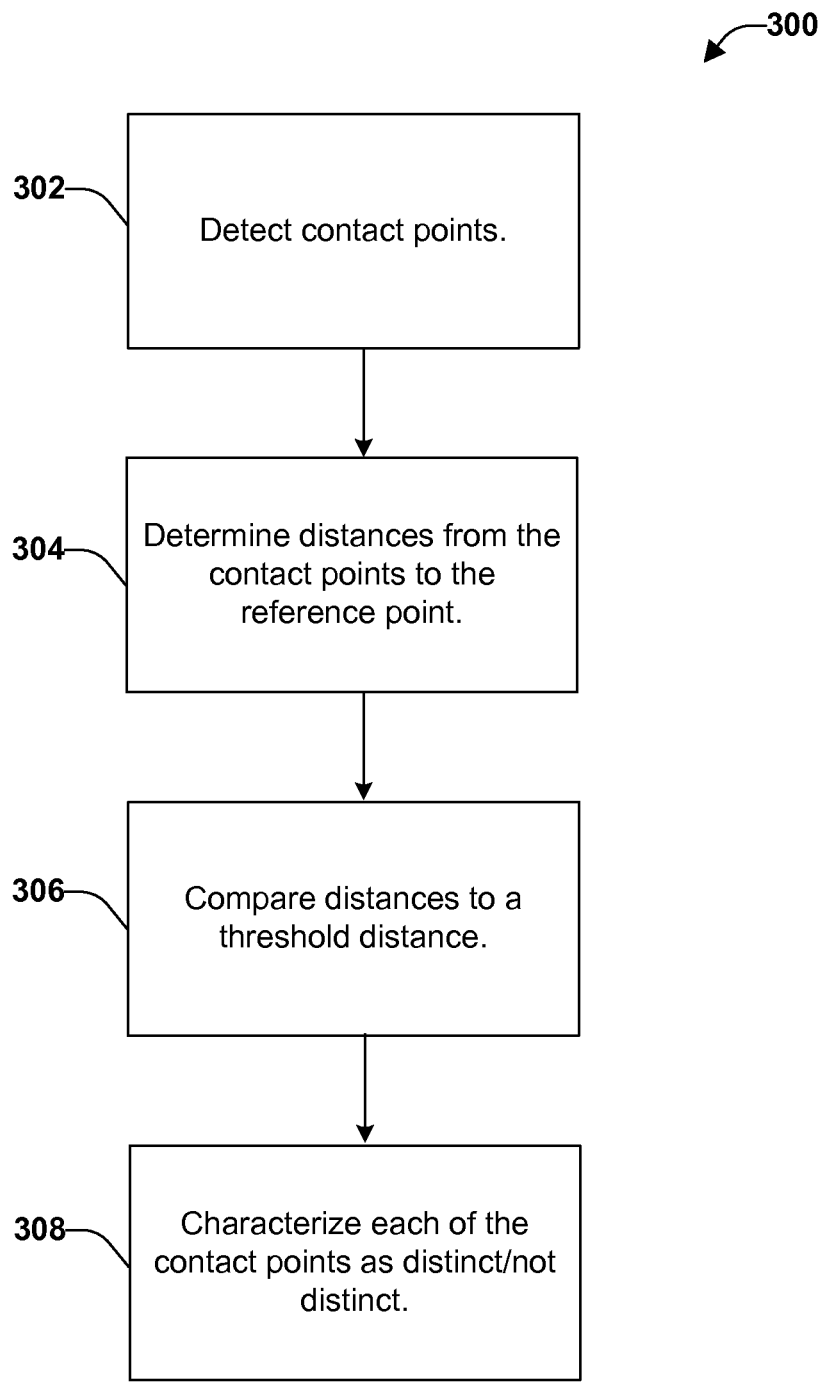
FIG. 3 is a schematic process flow diagram of a method for detecting distinct contact points.

FIGS. 2 and 3 illustrate methods 200 and 300 determining if contact points are distinct. To avoid activating the finger registration method 100 through incorrect touching inputs, method 200 can determine that the contact times associated with each of the contact points are within a reasonable range and method 300 can determine that the contact points are within a reasonable distance from the reference point 116 and also that the spanning angle of each finger is within a reasonable range. Either of method 200 or method 300 can be employed individually with method 100 to facilitate the avoidance of activating finger registration method 100 through wrong touching inputs. Methods 200 and 300 can also be employed together in connection with method 100 to facilitate the avoidance of activating finger registration method 100 through wrong touching inputs.

FIG. 2 illustrates a method 200 for avoiding incorrect activation of method 100 by determining if contact points are distinct. At element 202, contact points are detected. For example, the contact points can be detected in a method similar to element 130 described above with respect to method 100. At element 204, contact times can be determined for each of the contact points. At element 206, the contact times can each be compared to a threshold contact time. The threshold contact time can be defined as a time that indicates that the user has made a decision to activate finger registration method 100 and can be set to be any number within a reasonably short period, such as 1 second. At element 206, based on the comparison to the threshold time, each of the contact points can be characterized as distinct or not distinct.

FIG. 3 illustrates a method 300 for avoiding incorrect activation of method 100 by determining if contact points are distinct. At element 302, contact points are detected. For example, the contact points can be detected in a method similar to element 130 described above with respect to method 100. At element 304, connecting distances between the contact points and the reference point can be determined. Element 304 can also include determining the spanning angles for the connecting points similarly to element 150 of method 100. At element 306, the connecting distances (and/or the spanning angles) can each be compared to one or more threshold distances. The threshold distances can relate to a minimum distance or a maximum distance (and/or minimum or maximum spanning angle). The threshold connecting distance can be defined as distance corresponding to a hand in a natural position. The threshold distances can be small and large enough to incorporate all possible sizes of hands (e.g., a small child's hands or a large adult's hands and anything in between). For example, the threshold distance can be set as between 5 and 15 centimeters. Similarly, the spanning angles can be compared with reasonable threshold spanning angles. The spanning angle should be small and large enough to incorporate difference possible natural poses of the touching hands. At element 306, based on the comparison to the threshold connecting distance and/or threshold spanning angle, each of the contact points can be characterized as distinct or not distinct.

For a multi-touch device 102 that can support more than ten contact points, it is possible to group the contact points based on their spatial distances and contact time and apply finger registration to each group. In other words, method 100 can support the simultaneous use of the touch screen. The orientation and location of each hand can provide information to distinguish different users, which is useful for multi-user applications such as interactive games and collaborative editing. Multiple instances of the same interface, such as virtual keyboards, can be provided to all users simultaneously, but each of the instances can have its own orientation and scale based on the registered hand and fingers for the individual users.

Figure 4:
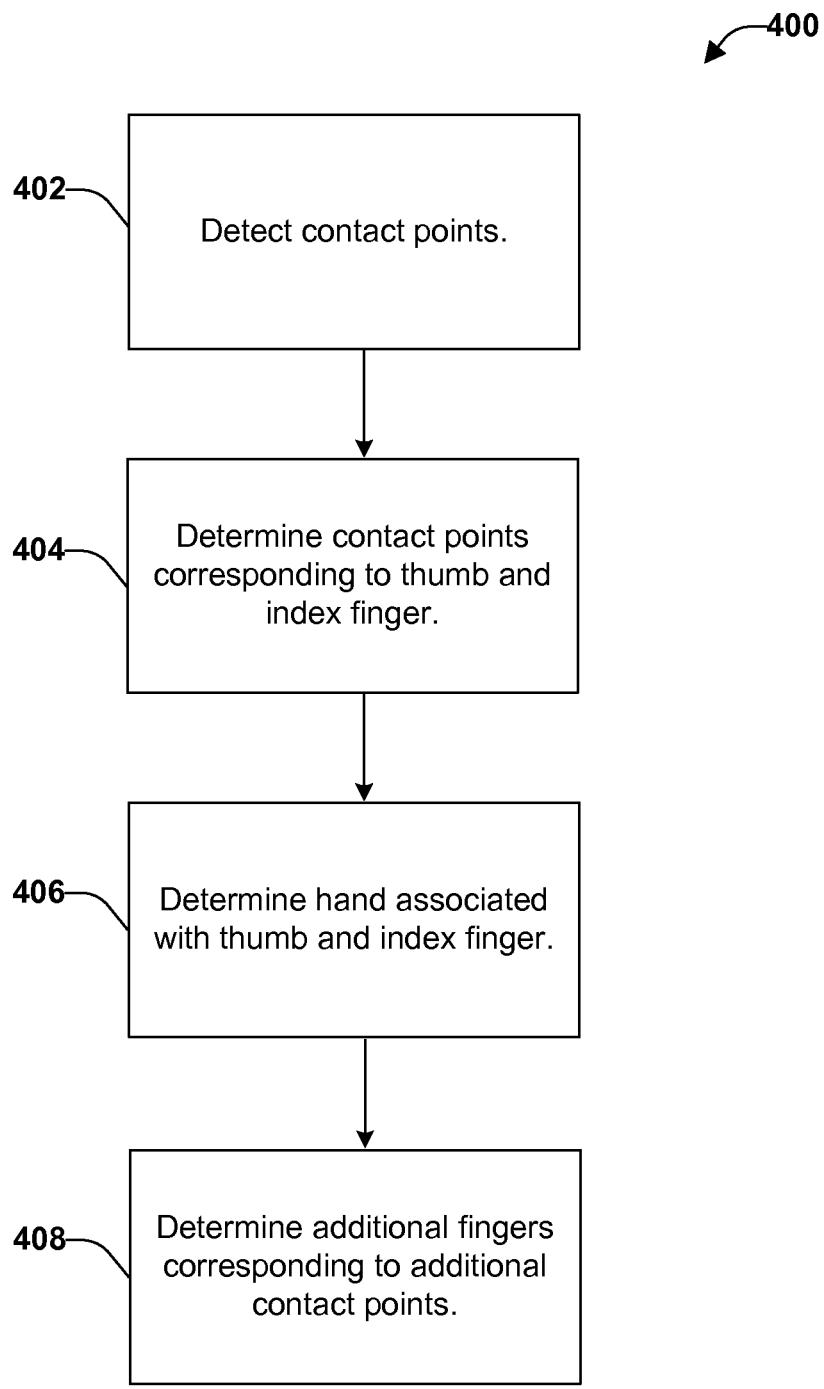
FIG. 4 is a schematic process flow diagram of a method for finger registration of a single hand on a touch device.

Referring now to FIG. 4, illustrated is a method 400 for detecting fingers of a single hand contacting the surface of a multi-touch device. At element 402, contact points where fingers touch the surface of the touch device can be detected in any means similar to those described with respect to method 100. Either of method 200 or method 300 can be employed to determine if the contact points are distinct contact points. At element 404, contact points corresponding to the thumb and index finger are determined in any means similar to those described with respect to method 100. At element 406, whether the hand contacting the interface is a left hand or a right hand can be determined based on the orientation of the thumb and index finger. The hand can be determined to be a left hand if the index finger is located counter clockwise from the thumb. The hand can be determined to be a right hand if the index finger is located clockwise from the thumb. At element 408, additional fingers can be determined to correspond to the additional contact points—in the counter clockwise direction for the left hand and in a clockwise direction for the right hand.

Figure 5:
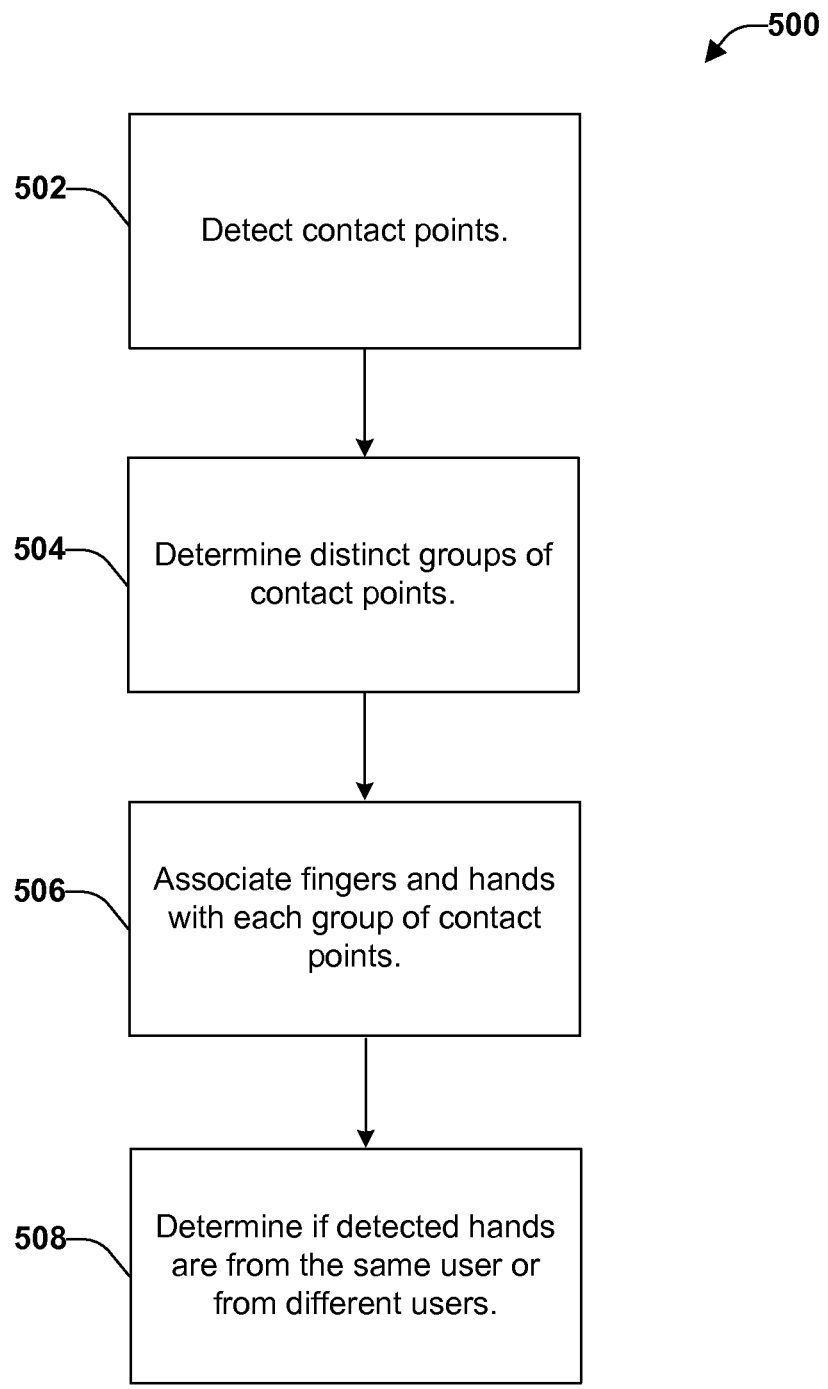
FIG. 5 is a schematic process flow diagram of a method for finger registration of multiple hands contacting a multi-touch device.

Referring now to FIG. 5, illustrated is a method 500 for detecting fingers of multiple hands contacting the surface of a multi-touch device. Depending on hardware limitation on the number of detectable contact points, two hands from a single user or two or more hands from different users can be detected.

At element 502, contact points where fingers touch the surface of a touch device can be detected in any means similar to those described with respect to method 100 (methods 200 and/or 300 can also be employed to determine if the contact points are distinct contact points). The contact points can correspond to five fingers on one hand and five fingers on a second hand. If there are device restriction on the number of contact points, only the thumb, index finger and ring finger of the first hand and the thumb, index finger and ring finger of the second hand need to be detected.

At element 504, distinct groups of contact points can be detected. The contact points can be placed in groups based on differences in spatial distance, orientations, or scales between the contact points, for example. At element 506, fingers and hands can be associated with each group of contact points in any means similar to those detected with respect to method 100. A thumb and index finger correspond to a left hand if the index finger is located counterclockwise from the thumb. A thumb and index finger correspond to a right hand if the index finger is located clockwise from the thumb. At element 508, it can be determined if the hands are from the same user or from different users based on differences in spatial distances, orientations and scales between the detected hands. For example, if two hands are both either left hands or right hands, this can be an indication that the hands are from different users.

Hands can be determined as belonging to different users based on differences in scale, spatial distances, and/or orientation of the hands. If one of these values is larger than the predefined thresholds, the detected hands can be considered to be from different users. The thresholds can be defined based on the physical limitations of human poses and natural multi-touch manipulations.

For example, even though two hands of the same user can be posed with orientation difference of 180 degrees (e.g., in opposite orientations), but these are not "natural" poses and not usual poses for performing multi-touch manipulation. Thus such two detected hands would be considered from two different users. In this case, setting the orientation threshold to 120 degree could be a reasonable threshold value. Similar setting can be used for other thresholds (distance and scale differences between hands). Other obvious additional conditions, such as the fact that each user has at most one left hand and one right hand, can also be utilized to detect that the hands are from different users (e.g., if two right hands are detected, they must be from different users).

Multi-touch interfaces can be dynamically customized to be in place based on the finger registration method 100 (and additional methods 200-500). All examples of user interfaces that are dynamically customizable and in place based on the finger registration method 100 are within the scope of this application.

Figure 6:
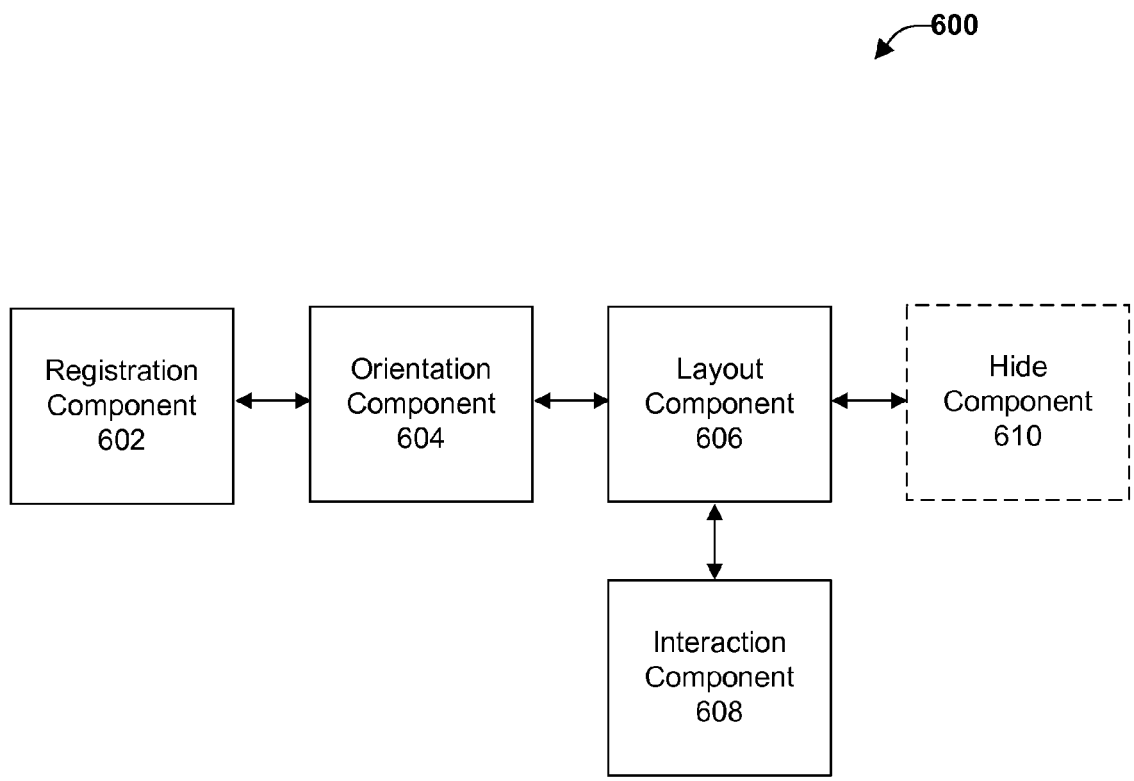
FIG. 6 is a schematic system block diagram of a system that generates a customized in place user interface based on finger and hand registration.

A system 600 that can generate an in place pop-up user interface based on finger registration is shown in FIG. 6. The system can include a registration component 602 that can register fingers and hands according to the finger registration method 100 (and optionally any one of methods 200-500). The system can also include an orientation component 604 that can facilitate the determination of the alignment of the hand and fingers so that the pop-up interface can be generated according to the orientation of the hand. The system can also include a layout component 606 that can facilitate the generation of the pop-up interface at the location of the fingers (e.g., with different menu buttons at the different contact points corresponding to the fingers). The pop-up interface can have a basic layout, and the layout component 606 can configure the basic layout so that different parts of the basic layout correspond to the size and orientation of the hand and the relative positions of the fingers. The system 600 can also include an interaction component 608 that can facilitate interaction between the user and the pop-up interface (e.g., allowing the user to input a command). The system 600 can also optionally include a hide component 610 that can be configured to hide the display of the pop up user interface after a period of inactivity or an explicit command.

Figure 7:
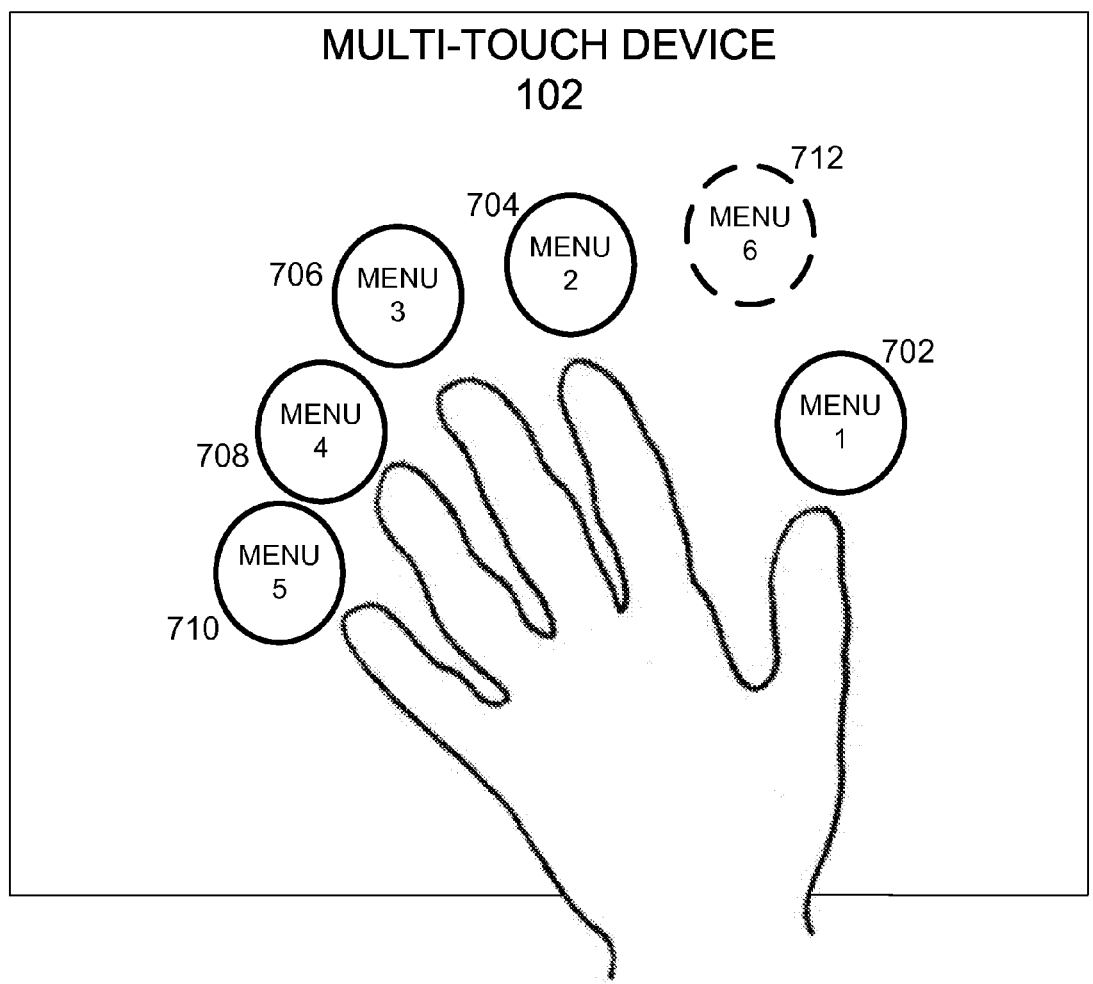
FIG. 7 is a schematic diagram of an example of a customized, in place pop up user interface, a palm menu.
Figure 8:
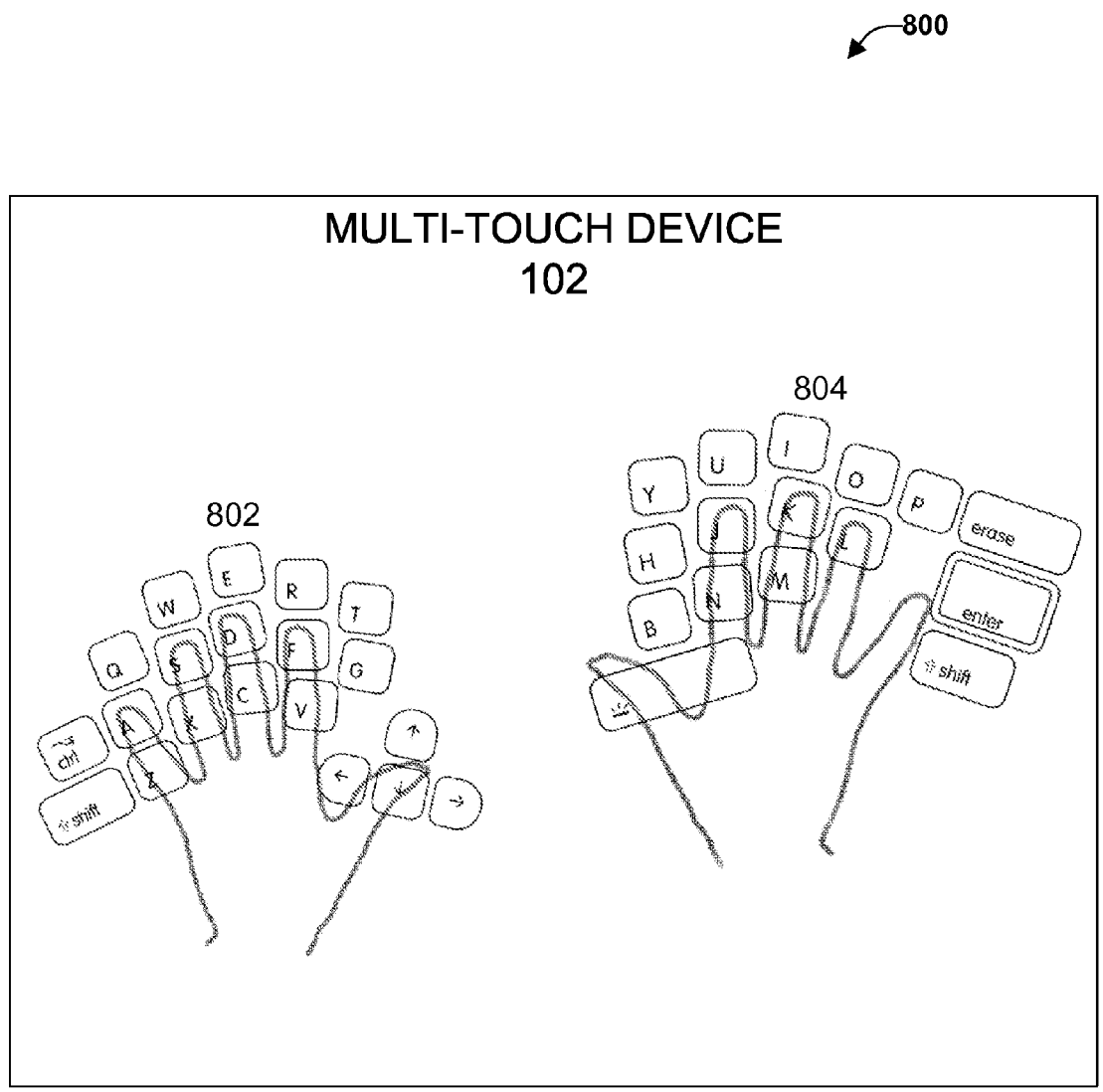
FIG. 8 is a schematic diagram of an example of a customized, in place pop up user interface, a virtual keyboard.

To provide concrete examples of such pop-up interfaces, two examples of pop-up interfaces will be discussed herein. An example of a palm menu is shown in FIG. 7 and an example of a virtual keyboard is shown in FIG. 8.

In traditional desktop computing, menu systems are standard user interface elements for navigating and accessing commands. Menu systems, in general, should provide efficient access and avoid covering too much of the main working screen area. To provide fast access and to minimize a user's cursor and eye movement, pop-up menus are a common solution to issue commands at (or close to) cursor location; however, the user is still required to select the desired menu item from a list of items, which involves focus switching between the current object and the list of menu items. Radial menus and marking menus can allow commands to be selected by dragging in specific directions after the menu is activated. This can reduce user interaction and can avoid wrong selections caused by dynamic location of pop-up menus; however, dragging in a direction still requires a user to move the cursor. In a tactile environment, palm movements, such as dragging, should be minimized. One example of a pop-up menu that can be customized to correspond to a user's fingers is the palm menu 700 shown in FIG. 7. The palm menu 700 is generated in place based on the finger registration method 100 (or alternatively method 200-500). The palm menu described herein outperforms the traditional toolbar and pop-up menu techniques since visual focus switching and hand movement are minimized when a user selects a command using the palm menu.

The palm menu 700 can be generated when a user taps the device. The tap can be a five-finger tap or any other multi-touch gesture. Examples of a five-finger tap are a touch and raise, gesture. The tap can trigger the finger registration method 100 (or 200-500); based on the finger registration, the device can activate and/or generate a user interface including menu buttons 702-710 directly at the contact points. Menu buttons 702-710 can correspond to five or more commands that a user can choose without changing visual focus and with minimal extraneous hand motions.

The menu buttons 702-710 can indicate various commands, objects, or the like. The menu buttons 702-710 can correspond to any functionality that can allow a user to tap one of the menu buttons 702-710 without visual focus switching or additional hand motions to select a desired command. Although circles are shown, the "menu buttons" 702-710 can be displayed as any shape or no shape at all (e.g., the palm menu can work on touch pad with in-place buttons that are not necessarily displayed). The menu buttons 702-710 can be displayed on the display unit to provide visual assistance to the user; however, operation of the palm menu 700 does not rely on the visual feedback. The menu buttons 702-710 can be invisible so that the palm menu 700 can work on a touch panel without display functionality.

The layout of the palm menu can be dynamically customized to the specific user based on the registration independent of the hand's location, orientation and scale, allows for imprecise input, and supports two-hand manipulation. This design is simple and intuitive since different commands are directly mapped to different fingers through the menu buttons. Moreover, users do not need to displace the hand via extraneous hand motions since only a five-finger tap is required to activate the palm menu and another in-place tap to select a command. Users do not even need to view the pop-up buttons since the buttons are already located exactly at the finger contact points. This avoids the switching of focus between the object to be manipulated and the menu itself. Additionally, the display can be hidden in response to an expiration of time with no gestures on the interface or in response to receipt of a gesture command indicating that the palm menu should be hidden.

In the case of five menu buttons, a finger tap (e.g., a single, five-finger tap) can activate five menu buttons 702-710. Additional menu buttons, such as menu button 712 can be used if more than 5 menu buttons are needed. The locations of the additional menu buttons are according to the contact points and hand orientation. These additional menu buttons shifted from the basic buttons 702-710 to facilitate tapping using the corresponding fingers of a slightly shifted hand, such as menu button 712 to select extra commands. These menu button arrangements can extend the interface to allow intuitive and efficient selection of more commands.

In the case of more than five menu buttons, if a shifted buttons technique is used, then the first five menu buttons will be located at the finger contact points and the remaining menu buttons will be shifted and located next to the first five menu buttons according to the hand orientation and contact point locations. If a shifted button technique is used, then the sixth and above menu item is activated by a single finger tap; if the finger chord technique is employed, the sixth and above menu item can be activated by a multiple finger tap on multiple buttons. Additional menu buttons can be shifted from the five basic buttons to facilitate tapping using the corresponding fingers of a slightly shifted hand to select extra commands.

The functionality associated with the buttons can be selected with another gesture, such as another tap. The five-finger tap can also be integrated with the object selection step, eliminating a separate action to select an object, such as text, an image, a three dimensional object or the like, for editing.

Another example of a pop-up interface is a virtual keyboard 800, as shown in FIG. 8. The virtual keyboard 800 is a two-hand interface and can be activated with a two-hand gesture, such as a two-hand five finger tap. With the two hand gesture, five contact points are determined from each hand; or at least thumb, index and middle fingers are determined in the case of hardware limitation on the number of detectable contact points. The virtual keyboard 800 can be generated to correspond to the orientations of the hands and the relative positions of the fingers. User interactions often rely on graphical user interfaces or through direct manipulation of objects; however, there are cases when a user needs to input text, such as an address of a web site, a phone number, or the like, directly. A virtual keyboard 800 can allow the user to input this text. However, virtual keyboard often have a predefined layout and scale that do not fit all possible users with different palm size, finger lengths and fingertip sizes. Unlike physical keyboards, virtual keyboards do not have touchable and distinguishable keys and cannot provide physical feedback to the users; therefore, it is harder for the users to ensure that the correct keys are being typed.

A virtual keyboard 800 that can be generated based on the finger registration method 100 (or 200-500) can allow location, scale and other features of the keys to be adjusted according to the orientation and scale of the palm and fingers, reducing the risk or occurrence of typing errors. The virtual keyboard 800 automatically adjusted key locations 802, 804 so that the middle row of letter keys appears below the registered fingers for each hand. Names of the keys (e.g., numbers, letters, words, abbreviations, etc.) can be displayed on the virtual keys to provide visual assistance to the user. However, names of the keys need not be displayed.

The basic layout of the virtual keyboard 800 is based on a common finger placement while typing on a standard 101-key layout keyboard. The basic layout can be adjusted based on the orientations of the hands and the relative positions of fingers so that the middle row of letter keys is placed under the registered fingers of each hand and the keys in the row above and the row below are placed according to the orientation and separation between the contact points, such that the overall layout matches the orientation of the user's hands and the locations of individual fingers. The virtual keyboard 800 allows direct text input with an in-place interface that can adapt to the orientation and size of a user's hand and fingers, which can significantly reduce possible typing errors. The virtual keyboard can also be hidden upon receiving a gesture command indicating that the virtual keyboard should be hidden or after a certain time period has elapsed with no activity.

Figure 9:
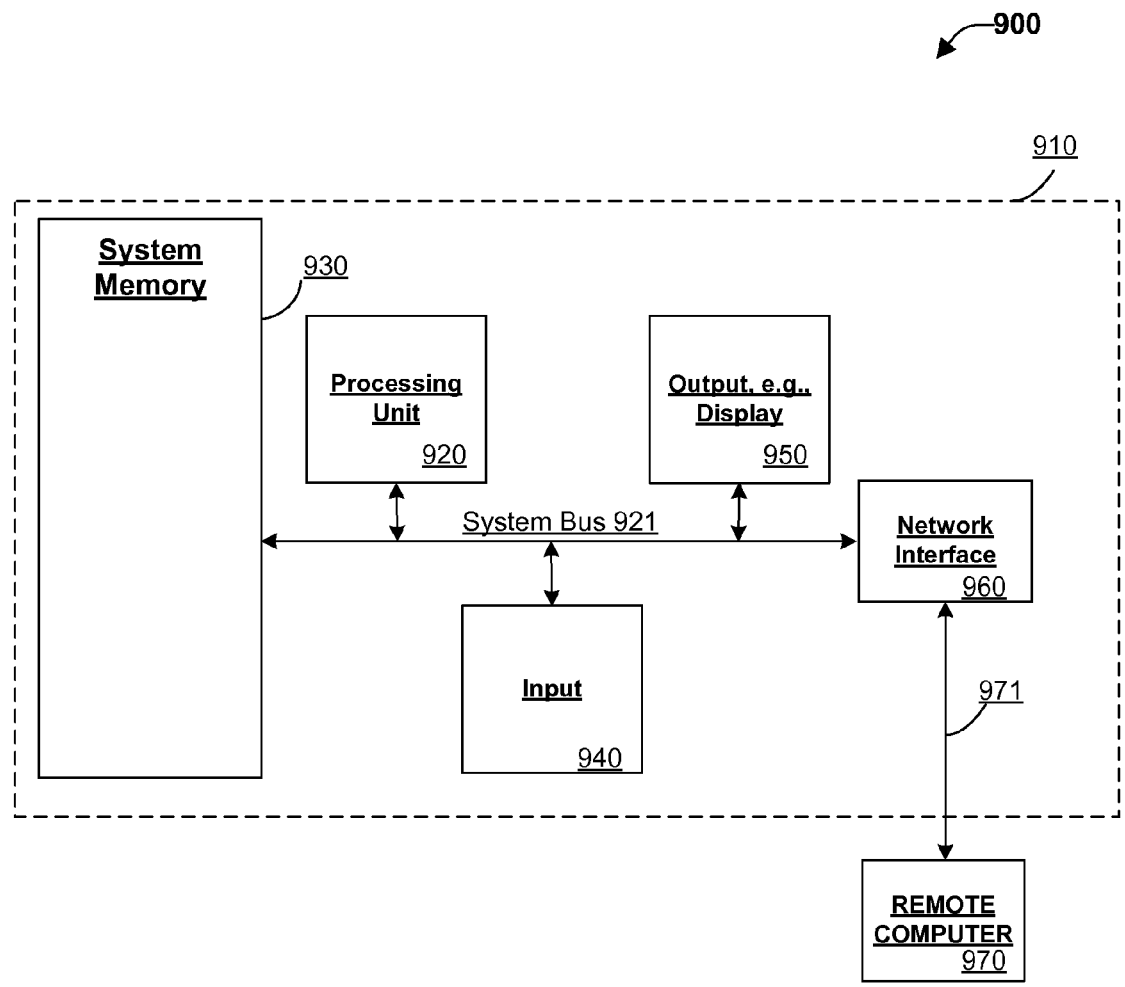
FIG. 9 is an example computing environment in which the various embodiments described herein can be implemented.
Figure 10:
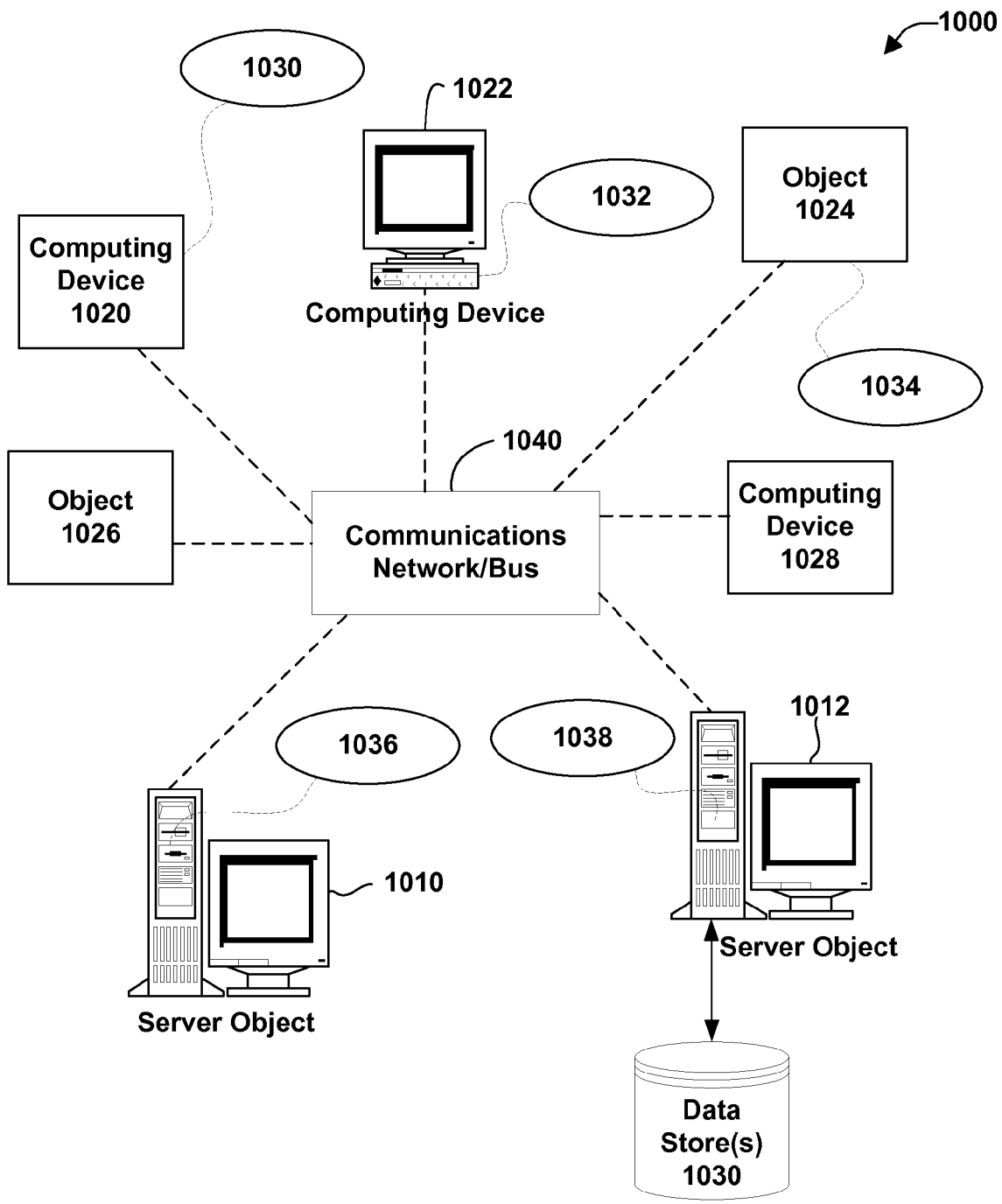
FIG. 10 is an example of a computer network in which various embodiments described herein can be implemented.

The systems and methods described above can be implemented in software, hardware, or a combination thereof. FIGS. 9 and 10 provide hardware context for the devices, user interfaces and methods described above. FIG. 9 illustrates a computing environment 900 that can be utilized in connection with the devices, user interfaces and methods described above. FIG. 10 illustrates a computing network 1000 that can be utilized in connection with facilitating the systems and methods described above. It should be appreciated that artificial intelligence can also be utilized to implement the systems and methods described herein.

Referring now to FIG. 9, illustrated is an example of a suitable computing system environment 900 in which one or more of the embodiments can be implemented. The computing system environment 900 is just one example of a suitable computing environment and is not intended to suggest any limitation as to the scope of use or functionality of any of the embodiments. Neither should the computing environment 900 be interpreted as having any dependency or requirement relating to any one or combination of components illustrated in the exemplary operating environment 900.

With reference to FIG. 9, the computing system environment 900 is shown as a handheld computer 910. However, the computing system environment 900 can be any other computing device with a processor to execute the methods described herein and a multi-touch display, such as a desktop computer, a laptop computer, a mobile phone, a mobile internet device, a tablet, a touch panel, or the like. Components of the handheld computer 910 can include, but are not limited to, a processing unit 920, a system memory 930, and a system bus 921 that couples various system components including the system memory to the processing unit 920. For example, the methods described herein can be stored in the system memory 930 and executed by the processing unit 920.

The handheld computer 910 can also include a variety of computer readable media, including tangible computer readable storage media, and can be any available media that can be accessed by computer 910. The system memory 930 can include computer storage media in the form of volatile and/or nonvolatile memory such as read only memory (ROM) and/or random access memory (RAM). By way of example, and not limitation, memory 930 can also include an operating system, application programs, other program modules, and program data.

A user can enter commands and information into the computer 910 through input devices 940, such as entering commands via a gesture on a multi-touch user interface. A monitor or other type of display device can also connected to the system bus 921 via an interface, such as output interface 950.

The computer 910 can operate in a networked or distributed environment using logical connections to one or more other remote computers, such as remote computer 970. The remote computer 970 can be a personal computer, a server, a router, a network PC, a peer device or other common network node, or any other remote media consumption or transmission device, and can include any or all of the elements described above relative to the computer 910. The logical connections depicted in FIG. 10 include a network 1071, such local area network (LAN) or a wide area network (WAN), but can also include other networks/buses. Such networking environments are commonplace in homes, offices, enterprise-wide computer networks, intranets and the Internet.

Referring now to FIG. 10, illustrated is a schematic diagram of an exemplary networked or distributed computing environment 1000. The handheld computer of FIG. 10 can be operational in the network of FIG. 10. The distributed computing environment comprises computing objects 1010, 1012, etc. and computing objects or devices 1020, 1022, 1024, 1026, 1028, etc., which can include programs, methods, data stores, programmable logic, etc., as represented by applications 1030, 1032, 1034, 1036, 1038. It can be appreciated that objects 1010, 1012, etc. and computing objects or devices 1020, 1022, 1024, 1026, 1028, etc. can comprise different devices, such as remote controllers, PDAs, audio/video devices, mobile phones, MP3 players, laptops, etc.

Each object 1010, 1012, etc. and computing objects or devices 1020, 1022, 1024, 1026, 1028, etc. can communicate with one or more other objects 1010, 1012, etc. and computing objects or devices 1020, 1022, 1024, 1026, 1028, etc. by way of the communications network 1040, either directly or indirectly. Even though illustrated as a single element in FIG. 10, network 1040 can comprise other computing objects and computing devices that provide services to the system of FIG. 10, and/or can represent multiple interconnected networks, which are not shown. Each object 1010, 1012, etc. or 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the delayed interaction model as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

As a further non-limiting example, various embodiments described herein apply to any handheld, portable and other computing devices and computing objects of all kinds are contemplated for use in connection with the various embodiments described herein, i.e., anywhere that a device can request pointing based services. Accordingly, the general purpose remote computer described below in FIG. 12 is but one example, and the embodiments of the subject disclosure can be implemented with any client having network/bus interoperability and interaction.

Although not required, any of the embodiments can partly be implemented via an operating system, for use by a developer of services for a device or object, and/or included within application software that operates in connection with the operable component(s). Software can be described in the general context of computer executable instructions, such as program modules, being executed by one or more computers, such as client workstations, servers or other devices. Those skilled in the art will appreciate that network interactions can be practiced with a variety of computer system configurations and protocols.

The above description of illustrated embodiments, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims.

What is claimed is:

1. A method, comprising:
    detecting, by a system comprising a processor, a set of contact points corresponding to at least a thumb, an index finger and a middle finger of a hand on a multi-touch device, wherein the hand is associated with a user identity of a set of user identities;
    determining, by the system, whether the hand is a left hand or a right hand based on a set of finger spanning angles comprising a sum of any two angles between three lines connecting at least a first contact point of the set of contact points, a second contact point of the set of contact points, and a third contact point of the set of contact points to a reference point, wherein the first contact point corresponds to the index finger, the second contact point corresponds to the middle finger, and the third contact point corresponds to the thumb;
    comparing, by the system, the set of finger spanning angles to a set of registration profile data representing respective finger spanning angles of the set of user identities; and
    identifying, by the system, the user identity based on a result of the comparing of the set of finger spanning angles to the registration profile data.

2. The method of claim 1, further comprising:
    determining, by the system, a set of contact times for the set of contact points;
    comparing, by the system, the set of contact times to a threshold time; and
    characterizing, by the system, the first contact point, the second contact point, and the third contact point of the set of contact points as distinct when a respective contact time is determined to be greater than the threshold time.

3. The method of claim 1, further comprising:
    determining, by the system, a set of distances between the first contact point and the reference point, the second contact point and the reference point, and the third contact point and the reference point;
    comparing, by the system, the set of distances to a threshold distance; and
    characterizing, by the system, the first contact point, the second contact point, and the third contact point of the set of contact points as distinct when a respective distance measurement of the set of distances is determined to be greater than the threshold distance.

4. The method of claim 1, further comprising determining, by the system, a center point with respect to the set of contact points as the reference point.

5. The method of claim 1, wherein the sum of the any two angles is the sum of a first angle on a left side of a connecting line between a contact point of the set of contact points and the reference point and a second angle on a right side of the connecting line between the contact point of the set of contact points and the reference point.

6. The method of claim 1, further comprising associating, by the system, the thumb with the third contact point of the set of contact points based on the thumb being determined to have a third finger spanning angle of the set of finger spanning angles that is greater than a first finger spanning angle and a third finger spanning angle respectively, wherein the first finger spanning angle and third finger spanning angle correspond to the index finger and the middle finger, respectively.

7. The method of claim 6, wherein the associating further comprises associating the index finger with the first contact point of the set of contact points, and wherein the associating is based on a determination that a first distance between the third contact point and the first contact point is less than a second distance between the third contact point and the second contact point.

8. The method of claim 6, further comprising rejecting, by the system, an association of the thumb with the third contact point based on the third finger spanning angle being determined to be outside a range of acceptable angles.

9. The method of claim 1, wherein the determining further comprises determining whether the set of contact points corresponds to the left hand or the right hand based on a first position of the thumb relative to a second position of the index finger.

10. The method of claim 9, further comprising associating, by the system, the second contact point of the set of contact points with the middle finger, a fourth contact point of the set of contact points with a ring finger, and a fifth contact point of the set of contact points with a pinkie finger, respectively, based on the determining whether the set of contact points corresponds to the left hand or the right hand.

11. The method of claim 1, further comprising concurrently concurrently detecting, by the system, contact points corresponding to at least a first thumb, a first index finger and a first middle finger of the left hand, and a second thumb, a second index finger, and a second middle finger of the right hand on the multi-touch device.

12. The method of claim 11, wherein the left hand and the right hand correspond to different user identities of the set of user identities.

13. The method of claim 1, further comprising presenting, by the system, a set of reorganized and resized user interface elements customized to the user identity, wherein the set of reorganized and resized user interface elements comprises a button, a menu, and a keyboard layout based on the set of finger spanning angles, the sum of the any two angles, a palm size, a set of finger lengths, and a set of fingertip sizes.

14. A non-transitory computer-readable storage medium having stored thereon instructions, the instructions comprising:
   detecting a set of contact points corresponding to at least a thumb, an index finger and a middle finger of one or more hands on a multi-touch device;
   comparing a set of information related to the set of contact points to reference information of one or more user identities resulting in a set of compared information, wherein the set of information comprises a sum of any two angles between three lines connecting a first contact point, a second contact point, and a third contact point of the set of contact points to a reference point, wherein the first contact point corresponds to the index finger, the second contact point corresponds to the middle finger, and the third contact point corresponds to the thumb;
   identifying a user identity from the one or more user identities based on the set of compared information; and
   associating a left hand or a right hand, of the one or more hands, corresponding to the user identity with the index finger, the middle finger, and the thumb based on the set of compared information.

15. The non-transitory computer-readable storage medium of claim 14, wherein the associating the respective fingers with the contact points further comprises:
   grouping the set of contact points into a first subset of contact points of the set of contact points and a second subset of contact points of the set of contact points based on the set of compared information, wherein the first subset of contact points and the second subset of contact points correspond to the left hand and the right hand, respectively.

16. The non-transitory computer-readable storage medium of claim 14, the instructions further comprising receiving a touch input corresponding to a function of the user interface.

17. The non-transitory computer-readable storage medium of claim 14, the instructions further comprising hiding the user interface after a defined length of time absent touch input received by the user interface.

18. The non-transitory computer-readable storage medium of claim 14, wherein the adjusting the menu, the button, and the keyboard layout of the user interface further comprises adjusting a location, a scale or a spatial arrangement of elements of the user interface based on locations of the set of contact points.

19. A non-transitory computer-readable storage medium of claim 14, the instructions further comprising adjusting a menu, a button, and a keyboard layout of a user interface in accordance with a set of preferences corresponding to the user identity, wherein the set of preferences are based on the set of compared information and the sum of the any two angles.

20. A system, comprising:
   a memory to store executable components; and
   a processor, coupled to the memory, that executes or facilitates execution of the executable components, the executable components comprising:
      a registration component configured to:
         detect a set of contact points on a multi-touch device,
         group the set of contact points into a first subset of contact points and a second subset of contact points of the set of contact points, and
         associate the first subset of contact points and the second subset of contact points with a left hand and a right hand, respectively, wherein the left hand and the right hand are associated with a user identity of a set of user identities;
      an orientation component configured to determine an orientation, a scale, a first set of spanning angles comprising a first sum of any two angles between three lines connecting the first subset of contact points to a first reference point, and a second set of spanning angles comprising a second sum of any two angles connecting the second subset of contact points to a second reference point;
      a comparing component configured to compare a set of contact point information comprising the orientation, the scale, the first set of spanning angles, and the second set of spanning angles to a set of user registration profile information comprising orientation information, scale information, and spanning angle information corresponding to the set of user identities; and
      an identification component configured to identify the user identity associated with a user registration profile of the set of user registration profile information based on a comparison result output from the comparing component.

21. The system of claim 20, wherein the user interface comprises a pop up user interface.

22. The system of claim 20, wherein the user interface comprises a window, a text box or an image box that exists before an assignment of the layout of the user interface.

23. The system of claim 20, wherein the executable components further comprise an interaction component configured to allow a user associated with the user identity to interact with the user interface according to a touch input.

24. The system of claim 20, wherein the executable components further comprise a hiding component configured to hide the user interface for a determined length of time absent touch input received by the user interface.

25. The system of claim 20, wherein the left hand is associated with a first user identity of the set of user identities of a first person and the right hand is associated with a second user identity of the set of user identities of a second person.

26. The system of claim 20, wherein a left keyboard of the user interface corresponds to the left hand and a right keyboard of the user interface corresponds to the right hand.

27. The system of claim 20, wherein the executable components further comprise a layout component configured to adjust a location, a scale or a spatial arrangement of elements of the user interface based on a set of locations of the set of contact points.

28. The system of claim 20, further comprising an assignment component configured to assign a layout of a user interface to the user registration profile based on the comparison result.

\* \* \* \* \*